March 22, 1966 C. W. RICHTER III 3,241,800
MOUNTING DEVICE
Filed Dec. 11, 1963

INVENTOR.
Charles W. Richter III
BY
Jackwood, Woodard, Smith & Wiekart
Attorneys United States Patent Office 3,241,800
Patented Mar. 22, 1966

3,241,800
MOUNTING DEVICE
Charles W. Richter III, Marion, Ind., assignor to General Plastics Corporation, Marion, Ind., a corporation of Indiana
Filed Dec. 11, 1963, Ser. No. 329,671
4 Claims. (Cl. 248—231)

The present invention relates to a mounting device particularly adapted for mounting outdoor decorations on utility poles and the like.

During various holidays and particularly during the holiday season, it is the frequent practice in the downtown section of cities and in shopping centers and the like to hang various outdoor decorations including Christmas ornaments, wreaths, garlands, etc. Frequently, such decorations are supported on utility poles. One object of the present invention is to provide an improved device for mounting such decorations and for mounting decoration supporting devices.

A further object of the invention is to provide a mounting device for mounting objects on a utility pole, said device requiring only a single strap yet providing a secure mounting.

Another object of the invention is to provide a mounting device for a utility pole which can be easily and conveniently mounted by a single person located on one side of the pole.

Still another object of the invention is to provide a mounting device which is sufficiently small and compact that in various applications it can be left in place all year round thus eliminating the necessity to reinstall and remove each year and making the mounting of decorations relatively easy and fast.

Still a further object of the invention is to provide a mounting device which can be used to support additional weight by attachment to the device of further such devices.

A further object of the invention is to provide a mounting device which can be secured in place without the use of a band if preferred.

Another object of the invention is to provide a mounting device which incorporates improved means for securing a band or strap of the mounting device to buckles thereof.

Still another object of the invention is to provide a mounting device which incorporates means for taking up a greater amount of slack in the strap than previously available devices.

Still a further object of the invention is to provide a mounting device which is less dangerous to secure in position on utility poles, buildings, etc.

Related objects and advantages will become apparent as the description proceeds.

One embodiment of the invention might involve a mounting device comprising an extruded face plate having a constant cross section and including a central flat web portion and a pair of legs projecting oppositely and perpendicularly of said face plate from the opposite transverse edges thereof, the two legs on one side of said plate being adapted to engage a utility pole, wings extending outwardly of said legs and curving away from said two legs and defining with said other two legs a pair of concave surfaces facing away from said first two legs, a pair of half-cylindrical members each received against one of said concave surfaces, said wings each having a slot extending therethrough and across the wing at the deepest portion of concave surface, one of said slots extending completely across said wing to the distal end thereof while the other of said slots extends only partially across said wing, a pair of buckles each having a perpendicular flange integral therewith, a pair of screws each extending through a respective one of said slots and through a respective one of said half-cylindrical members, a pair of nuts each received on one of said screws and bearing against the flat face of a respective one of said half-cylindrical members, and a strap threaded into one of said buckles at one end of the strap and threaded into the other of said buckles at the other end of the strap.

The full nature of the invention will be understood from the accompanying drawings and the following description and claims.

Figure 1:
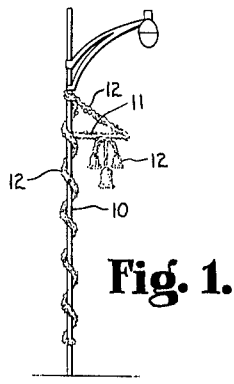
FIG. 1 is a side elevaton of a light pole having the mounting device of the present invention secured thereon and supporting Christmas decorations.
Figure 2:
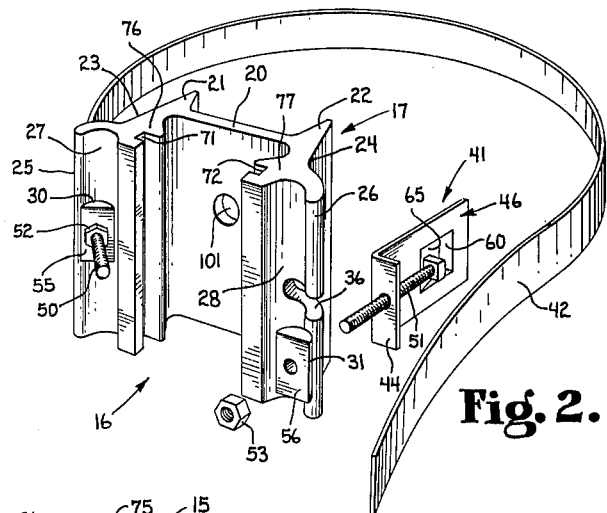
FIG. 2 is an exploded perspective of the mounting device of the present invention.
Figure 3:
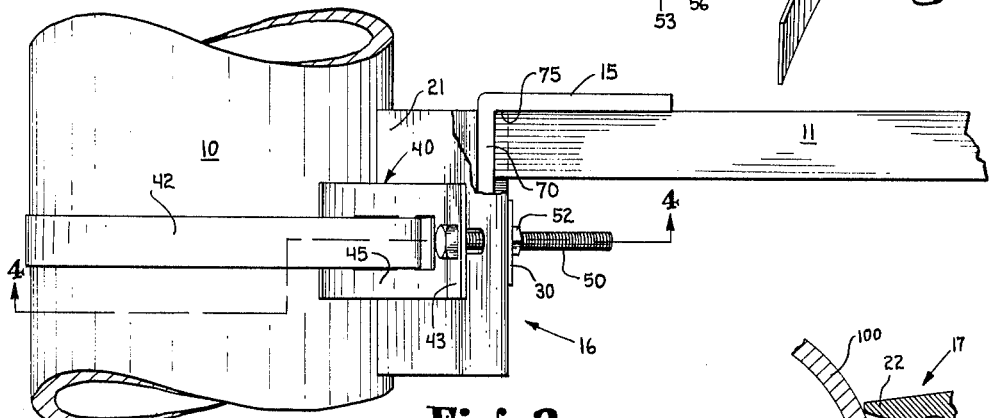
FIG. 3 is a fragmentary side elevation of the mounting device of the present invention showing it secured to the utility pole.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a light pole 10 having a horizontally projecting member 11 secured thereto, said member 11 supporting various Christmas decorations 12. The member 11 has fixed to its proximal end a right angle member 15 which is supported upon the light pole 10 by the mounting device 16.

The mounting device 16 includes a face plate 17 which which incorporates a central flat web 20 and a plurality of legs 21, 22, 23 and 24. The legs 23 and 24 are perpendicular to the web 20 and project oppositely of the legs 21 and 22. It will be noted that the face plate 17 has a constant cross section along its length except for certain bores and slots and that consequently, the face plate 17 can be extruded making possible great economy in manufacture. After such extrusion and cutting off of the length of the face plate, the various required bores and slots can be easily placed in the face plate.

The two legs 21 and 22 give a positive two-line contact with the utility pole whether it has a smooth cylindrical shape as illustrated or a multi-sided or fluted shape. Preferably, the face plate is formed of aluminum which is harder than wood so that the legs 21 and 22 bite into the wood pole, thus effecting a firm attachment. In the case that the aluminum is mounted upon a steel utility pole, the relative softness of the aluminum permits firm seating of the legs 21 and 22 against the steel pole.

The face plate 17 also includes a pair of wings 25 and 26 which extend outwardly of the legs 23 and 24 and curve away from the legs 21 and 22 so as to define with the two legs 23 and 24 a pair of concave surfaces 27 and 28. A pair of half-cylindrical members 30 and 31 are each received against a respective one of the concave surfaces 27 and 28. Each of the wings 25 and 26 has a slot 35 and 36 extending therethrough and across or transversely of the wing at the deepest portion of the concave surface. The slot 35 extends only part way acros or transversely of the wing while the slot 36 extends completely thereacross and is open at the distal end of the wing.

A pair of buckles 40 and 41 are secured to the opposite ends of a stainless steel strap 42. Each of the buckles 40 and 41 has a flange 43 and 44 which extends perpendicularly of the main portion 45 and 46 and receives a screw 50 and 51. Threadedly received upon each of the screws 50 and 51 are nuts 52 and 53 each of which bears against the flat face 55 and 56 of the respective half-cylindrical member.

The buckles 40 and 41 are identical and consequently only the representative buckle 41 will be described. Formed within the main portion 46 of the buckle 41 is a pair of openings 60 and 61 which extend transversely of the length of the main portion 46. Between the two openings 60 and 61 the main portion 46 is cut and deformed to provide a tapering portion 65 which tapers away from the plane or planes defined by the main portion 46 and also tapers away from the flange 44. The tapering portion 65 defines at its distal end one side of the opening 60.

In order to mount the present device upon the utility pole 10, the strap 42 is inserted through the opening 61 around the tapering portion 65 and back through the opening 60 and laid alongside the central portion of the strap 42. The other end of the strap 42 is also in similar fashion inserted through the two openings in the buckle 40 and laid along the inside of the central portion of the strap. The screw 50 is assembled so as to project through the slot 35 but the nut 52 is unthreaded almost to the end of the screw. Similarly, the nut 53 is assembled with the half-cylindrical member 31 thereon and the nut 53 thereon but the nut 53 is unthreaded substantially the complete length of the screw. Preferably, the threading of the ends of the strap through the respective buckles is accomplished in such a manner that the size of the utility pole 10 is taken into account. Thus when the device is raised to proper height on the pole, the proper amount of slack is provided in the strap so that tightening of the nuts 52 and 53 produces a firm mounting upon the pole. Preferably, the above mentioned threading of both ends of the strap through the respective buckles is accomplished on the ground so that the installer need not carry out this function nor be encumbered by any loose parts when he is up in the air.

After the installer has climbed to the proper height on the pole, the device is quickly secured in place by placing the strap 42 about the pole, it being understood that the strap is already secured to the face plate by the screw 50, and by inserting the screw 51 through the slot 36 in the manner illustrated with the flange 44 on one side of the wing 26 and the half-cylindrical member 31 and the nut 53 on the other side of the wing 26. The nuts 52 and 53 are then tightened securing the face plate to the pole.

Because of the small size of the face plate 17 it may be desired to leave the face plate in mounted relation with the pole permanently. The decoration supporting member 11 may then be easily mounted upon the pole by merely dropping the portion 70 thereof into a pair of mutually facing slots 71 and 72 formed in the inside faces of the legs 23 and 24. When the portion 70 is so dropped into the slots 71 and 72, the surface 75 of the member 15 rests upon the upper surface 76 and 77 of the legs 23 and 24. Dismounting of the member 11 may be easily acomplished by merely raising the member upwardly away from the face plate 17.

Figure 5:
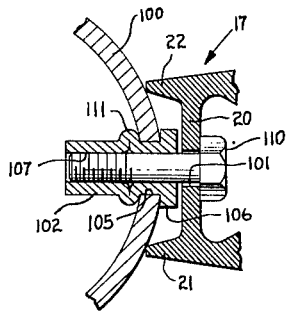
FIG. 5 is a section similar to FIG. 4 but showing an alternative means for securing the mounting device to the utility pole.
Figure 4:
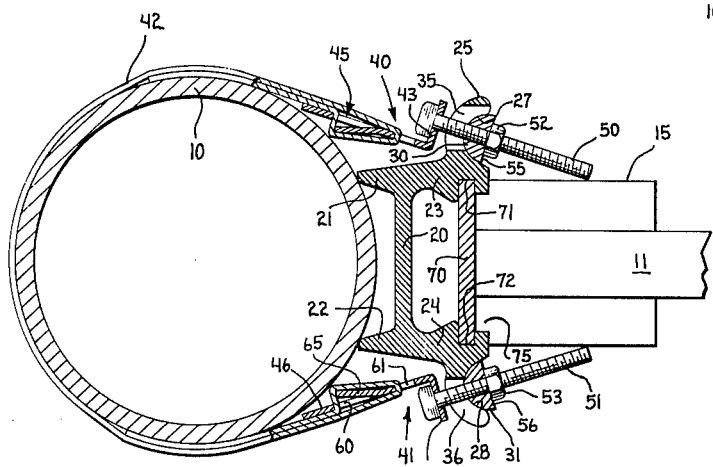
FIG. 4 is a horizontal section taken along the line 4—4 of FIG. 3 in the direction of the arrows.

In FIG. 5, there is illustrated an alternative manner of mounting the face plate 17 upon a utility pole 100. The face plate 17 is provided with a bore 101 which extends through the web 20. An annular member 102 is inserted through a bore 105 in the utility pole 100 in such a manner that the flange 106 of the member 102 abuts the outer surface of the utility pole. The annular member 102 is internally threaded at its end portion 107. A screw 110 is inserted through the bore 101 and into the annular member 102, the annular member 102 having been previously affixed to the pole by buckling at 111. As a further alternative, a lag screw can be used in the case of wood poles.

It has been found that the mounting device of the present invention requires only a single strap 42 because of the efficiency with which the buckles 40 and 41 grip the ends of the strap permitting no slipping of the strap through the buckles plus the fact that the single strap is located at the horizontal centerline of the face plate. It will be evident from the above description that one advantage of the present device is the fact that a person mounting the device need only work on one side of the utility pole because of the fact that the nuts 52 and 53 are located on the one side. Because the half-cylindrical members 55 and 56 are slidable across the concave surfaces 27 and 28, tightening of the nuts 52 and 53 does not bend the screws 50 and 51 but instead the screws align themselves in parallel relation to the main portions 45 and 46 of the buckles which are generally tangent to the utility pole 10. Thus, as the nuts are tightened, there is no tendency for the screws 50 and 51 to be bent because the members 30 and 31 slide across the surfaces 27 and 28. It should also be mentioned that screws 50 and 51 have square heads that engage the brackets and prevent turning of the screw while the installer tightens the nuts.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A mounting device comprising an extruded face plate having a constant cross section and including a central flat web portion and two pairs of legs, each pair projecting oppositely and perpendicularly of said face plate from respective opposite transverse edges thereof, a first two of said legs being on one side of said plate and being adapted to engage a utility pole, wings extending outwardly of the other two of said legs and curving away from said first two legs and defining with said other two legs a pair of concave surfaces facing away from said first two legs, a pair of half cylindrical members each received against a respective one of said concave surfaces, said wings each having a slot extending therethrough and across the wing at the deepest portion of the concave surface, one of said slots extending completely across said wing to the distal end thereof while the other of said slots extends only partially across said wing and is closed at the distal end of its respective wing, a pair of buckles each having a perpendicular flange integral therewith, a pair of screws each extending through a respective one of said flanges and slots and through a respective one of said half cylindrical members, a pair of nuts each received on one of said screws and bearing against the flat face of a respective one of said half cylindrical members, and a strap threaded into one of said buckles at one end portion of the strap and threaded into the other of said buckles at the other end portion of the strap, said buckles each including a flat elongated main body with said flange extending perpendicularly thereof from one end thereof, said screws each having a polygonal head which bears against the main body of the respective buckle and prevents the respective screw from rotating in its respective slot, said main body having a pair of openings therethrough spaced along the length thereof, said main body being deformed between said openings in such a manner that a portion thereof tapers away from the flat main body and away from said flange and defines one side of the one of said openings which is farthest away from said flange, said strap ends each being threaded inwardly through the respective opening adjacent said flange and looped back against the tapering portion and through the opening away from said flange with the distal end of the end portion lying against the inside of said strap.

2. A mounting device comprising an extruded face plate having a constant cross section and including a central flat web portion and two pairs of legs, each pair projecting oppositely and perpendicularly of said face plate from respective opposite transverse edges thereof, a first two of said legs being on one side of said plate and being adapted to engage a utility pole, wings extending outwardly of the other two of said legs and curving away from said first two legs and defining with said other two legs a pair of concave surfaces facing away from said first two legs, a pair of half cylindrical members each received against a respective one of said concave surfaces, said wings each having a slot extending therethrough and across the wing at the deepest portion of the concave surface, one of said slots extending completely across said wing to the distal end thereof while the other of said slots extends only partially across said wing and is closed at the distal end of its respective wing, a pair of buckles each having a perpendicular flange integral therewith, a pair of screws each extending through a respective one of said flanges and slots and through a respective one of said half cylindrical members, said screws each having a polygonal head which bears against its respective buckle and prevents the respective screw from rotating in its respective slot, a pair of nuts each received on one of said screws and bearing against the flat face of a respective one of said half cylindrical members, and a strap threaded into one of said buckles at one end of the strap and threaded into the other of said buckles at the other end of the strap.

3. A mounting device comprising a face plate having one surface adapted to engage a utility pole, wings extending outwardly of said plate and defining with said face plate a pair of concave surfaces facing away from said one surface, a pair of half cylindrical members each received against a respective one of said concave surfaces, said wings each having a slot extending therethrough and across the wing at the deepest portion of the concave surface, one of said slots extending completely across said wing to the distal end thereof while the other of said slots extends only partially across said wing and is closed at the distal end of its respective wing, a pair of buckles each having a perpendicular flange integral therewith, a pair of screws each extending through a respective one of said flanges and slots and through a respective one of said half cylindrical members, said screws each having a polygonal head which bears against its respective buckle and prevents the respective screw from rotating in its respective slot, a pair of nuts each received on one of said screws and bearing against the flat face of a respective one of said half cylindrical members, and a strap threaded into one of said buckles at one end of the strap and threaded into the other of said buckles at the other end of the strap.

4. A mounting device comprising a mounting element having a first surface adapted to engage a utility pole and a pair of concave surfaces facing away from said first surface, a pair of members each having a convex surface received against one of said concave surfaces and a flat surface facing away from its convex surface, said element having a pair of slots each extending therethrough and across a respective concave surface, a pair of strap end elements each having a perpendicular flange thereon, a pair of screws each extending through a respective one of said flanges and slots and through a respective one of said pair of members, a pair of nuts each received on one of said screws and bearing against the flat face of a respective one of said members, one of said pair of slots being close ended whereby its screw can only be removed therefrom by removal of its respective nut, the other of said slots being open ended at one end thereof whereby its screw can be removed therefrom by sliding the last mentioned screw out of the open end of the slot, and a strap looped between said strap end elements and around the pole.

References Cited by the Examiner

UNITED STATES PATENTS

| 928,010 | 7/1909 | Way | 248—226 |
|---|---|---|---|
| 1,303,346 | 5/1919 | McFeathers | 248—72 |
| 1,361,921 | 12/1920 | Stevens | 24—198 |
| 1,432,561 | 10/1922 | Johnson | 20—99 |
| 1,730,793 | 10/1929 | Stebler | 188—210 |
| 1,852,347 | 4/1932 | Getz | 248—231 |
| 2,012,466 | 8/1935 | Goldsmith et al. | 24—198 |
| 2,222,810 | 11/1940 | Daily | 174—163 |
| 2,383,881 | 8/1945 | Murphy | 248—231 |
| 2,634,939 | 4/1953 | Voss | 248—231 |
| 3,030,705 | 4/1962 | Gill | 85—70 |

CLAUDE A. LE ROY, *Primary Examiner.*